US011586600B2

(12) United States Patent
Faitelson et al.

(10) Patent No.: US 11,586,600 B2
(45) Date of Patent: Feb. 21, 2023

(54) IN-ADVANCE INDEXING

(71) Applicant: VARONIS SYSTEMS, LTD., Herzliya (IL)

(72) Inventors: Yakov Faitelson, New York, NY (US); Ohad Korkus, New York, NY (US); Ophir Kretzer-Katzir, Tenafly, NJ (US)

(73) Assignee: VARONIS SYSTEMS, INC, New York, NY (US)

( * ) Notice: Subject to any disclaimer, the term of this patent is extended or adjusted under 35 U.S.C. 154(b) by 451 days.

(21) Appl. No.: 14/071,673

(22) Filed: Nov. 5, 2013

(65) Prior Publication Data

US 2015/0127656 A1 May 7, 2015

(51) Int. Cl.
*G06F 16/22* (2019.01)
*G06F 16/901* (2019.01)
*G06F 16/28* (2019.01)

(52) U.S. Cl.
CPC ............ *G06F 16/22* (2019.01); *G06F 16/285* (2019.01); *G06F 16/901* (2019.01)

(58) Field of Classification Search
CPC ...... G06F 17/30; G06F 7/00; G06F 17/30312; G06F 17/30221; G06F 17/30368; G06F 9/467; G06F 17/00; G06F 16/285; G06F 16/22; G06F 16/901
USPC .................................................. 707/741, 705
See application file for complete search history.

(56) References Cited

U.S. PATENT DOCUMENTS

| 6,728,726 | B1 * | 4/2004 | Bernstein | G06F 16/289 |
| 7,555,488 | B2 * | 6/2009 | Bernstein | G06F 17/30607 |
| | | | | 707/999.003 |
| 8,099,400 | B2 * | 1/2012 | Haub | G06F 16/22 |
| | | | | 707/731 |
| 10,061,836 | B2 | 8/2018 | Faitelson et al. | |
| 2006/0069672 | A1 * | 3/2006 | Maloney | G06F 16/2272 |
| 2008/0046414 | A1 * | 2/2008 | Haub | G06F 17/30312 |
| | | | | 707/999.003 |
| 2011/0066937 | A1 * | 3/2011 | Loeser | G06F 16/81 |
| | | | | 715/241 |
| 2015/0278307 | A1 | 10/2015 | Faitelson et al. | |

OTHER PUBLICATIONS

Wook-Shin Han, Prefetching Based on the Type-Level Access Pattern in Object-Relational DBMSs, Apr. 2, 2001, IEEE, pp. 651-660.*

(Continued)

*Primary Examiner* — Hosain T Alam
*Assistant Examiner* — Tracy M McGhee
(74) *Attorney, Agent, or Firm* — Soroker Agmon Nordman (57) ABSTRACT

A method for in-advance obtaining properties of objects of a computerized system, the method comprising receiving a request for properties of a first object, and responsively providing the requested properties along with properties of an at least one another object that are similar to the properties of the first object, wherein the properties of the at least one another object are similar to the properties of the first object by having at least one element of properties that are common therebetween, and wherein the method is carried out by an at least one apparatus component of the computerized system, and an apparatus for performing the same.

13 Claims, 4 Drawing Sheets

(56) References Cited

OTHER PUBLICATIONS

Wook-Shin Han et al: "Prefetching based on the type-level access pattern in obeject-relational DBMSs" Apr. 2-6, 2001, Heidelber, Germany.*

Wook-Shin Han "Prefetching based on type-level access pattern in object-relational DBMSs", Proceedings $17^{th}$. International Conference o n Data Engineering, Heidelberg, Germany, Apr. 2-6, 2001.*

Philip A Bernstein et al: "Context-Based Prefetch for Implementing Objects on Relations", Proceedings of the 25th VLDB Conference, Sep. 7, 1999, pp. 327-338. Edinburgh, Scotland.

Wook-Shin Han et al: "Prefetching based on the type-level access pattern in object-relational DBMSs", Proceedings 17th. International Conference on Data Engineering. Heidelberg, Germany, Apr. 2-6, 2001.

* cited by examiner

IN-ADVANCE INDEXING

BACKGROUND

The present disclosure generally relates to objects of a computerized system, and more specifically to data of or about the objects.

Storing and maintaining, such as in an index or a database, data of or about objects of a computerized system, such as of or about files, is generally known in the art.

SUMMARY

One exemplary embodiment of the disclosed subject matter is a method for in-advance obtaining properties of objects of a computerized system, the method comprising receiving a request for properties of a first object, and responsively providing the requested properties along with properties of an at least one another object that are similar to the properties of the first object, wherein the properties of the at least one another object are similar to the properties of the first object by having at least one element that is common therebetween, and wherein the method is carried out by an at least one apparatus component of the computerized system.

Another exemplary embodiment of the disclosed subject matter is an apparatus for in-advance obtaining properties of objects of a computerized system, the apparatus comprising an at least one storage device and an indexing server configured to index and maintain properties of objects in the at least one storage device, wherein the indexing server is configured to receive a request for properties of a first object and to respond with the requested properties along with properties of an at least one another object that are similar to the properties of the first object, and wherein the properties of the at least one another object are similar to the properties of the first object by having at least one element of properties that is common therebetween.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, optionally with an additional letter or letters to distinguish between similar entities or variants of entities, and may not be repeatedly labeled and/or described.

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

DETAILED DESCRIPTION

In the context of the present disclosure, without limiting, the term 'enterprise' implies a computerized system comprising a plurality of computers communicating therebetween and having and/or sharing and/or communicating with a data storage device. The enterprise is also referred to as a 'computerized system' and the data storage device also referred to as 'data storage' or 'storage'.

For brevity, referring to an operation of the enterprise, such as sending of data, implies an operation of one or more components and/or computers of the enterprise.

Generally, without limiting, an enterprise comprises several computers in a range between about 10 computers and about 1000 computers or more. Optionally, an enterprise comprises less than 10 computers, not precluding having one computer as, for example, a mainframe computer.

In the context of the present disclosure, without limiting, the term 'object' implies a data element of the enterprise, such as a document, a file, a database, constructs having and/or relating to attributes of an object, for example, access permissions to the object.

In the context of the present disclosure, without limiting, the term 'index' implies a constructs such as an inventory or a catalog having data or information of and/or about objects, where data or information about an object is constructed in an entry of the index, generally an entry per object.

By way of a figurative example, an index may resemble a collection of cards or records of a book library, where each card or record, akin to an entry of an index, comprises information about the book in the library such as title, authors, publisher, code, summary of contents, keywords, classification, shelf location, borrowing restrictions or allowances, borrowing and returns histories and so forth.

In the context of the present disclosure, without limiting, the term 'indexing' implies compiling and constructing data or information about and/or of objects in an index.

Generally and without limiting, an index comprises entries corresponding to or respective to objects, such as names of objects, addresses of objects in a storage device and/or links to a network storage device, access histories of the objects, access permissions to the objects, classification of an object, attributes of the objects such as set by an operating system, and particularly keywords and/or phrases and/or extracts and/or citations and/or excerpts from the object, collectively also denoted as properties of and/or with respect and/or corresponding to an object. Similarly, an object corresponds to the properties thereof.

In some cases or embodiments, without limiting, a reference to properties of an object implies a reference to part of the properties and/or to a property of the object.

For brevity, according to the context, referring to properties implies properties of an object and/or objects.

For brevity, properties having one or more common elements and/or similar elements and/or other relationships therebetween are referred to as similar properties, and objects respective or corresponding to similar properties are referred to as similar objects.

In the context of the present disclosure, without limiting, the term 'indexing server' denotes one or more data processing apparatuses configured to index objects of the enterprise by properties of the objects and to maintain the properties of the objects. In some embodiments, the indexing server is configured to store the properties of the objects in one or more storage devices such as in a database where, optionally, the database comprises an index.

In the context of the present disclosure, without limiting, the term 'client computer' refers to a computer and/or a computerized device such a smartphone or tablet computer, linked and/or linkable to the enterprise such as to a component of the enterprise by a communication facility or facilities, such as by a network and/or the internet or wireless or mobile communication or any combination of communications. Generally, the client computer is configured for data transfers and/or exchange with the enterprise and/or a component thereof. Thus, generally and without limiting, at least as data or objects of a client computer are concerned, a client computer is regarded or considered as a part of the enterprise, though not necessarily a physical part thereof, optionally temporarily or for a certain time.

In the context of the present disclosure, without limiting, the term 'connect' or 'link' implies either directed communication connection and/or indirect communication such as via a network and/or interconnections of components.

In some embodiments, without limiting, a client computer is operated and/or controlled by a human operator which is also referred to a user. In some embodiments, referring to an operation of a client computer implies an operation controlled by a human operator of the client computer.

In the context of the present disclosure, without limiting, referring to a client computer being on-line and off-line with respect to an enterprise implies that the client computer is linked or not linked to the enterprise, respectively.

The terms cited above denote also inflections and conjugates thereof.

Generally, in some embodiments, a client computer of an enterprise intending to refer to and/or referring to an object of the enterprise poses a query to the indexing server of the enterprise about the object, and the indexing server responses in providing properties of the object with incurring overhead in communication and/or computational load. Referring to a plurality of objects necessitates separate queries and returned responses, each with a separate overhead in communication and/or computational load.

Generally, indexing of objects requires computational resources and time for collecting and structuring properties of objects, including exploring inside the objects to identify and extract elements such as keywords, phrases, references to embedded or linked items and so forth. It is noted that the indexing of objects in the enterprise may lag, leaving at least some objects with minimal index information and/or incomplete information. Such conditions may occur, for example, when plentiful of object reside in and/or linked to the enterprise.

One technical problem dealt by the disclosed subject matter is reducing computational load in acquiring properties of objects of an enterprise.

One technical solution according to the disclosed subject matter is configuring the indexing server of the enterprise to provide to a client computer, upon receiving a query about an object of the enterprise, properties of the object along with properties of objects that are determined or deemed to be subsequently required by the client computer, for subsequent update of the properties by the client computer.

In some embodiments, the properties of the objects are provided in one transmission, and providing the properties as a whole, involving about the same and/or similar overhead as a single query, thereby at least partly and/or potentially avoiding, at least potentially, superfluous queries and overhead thereof about objects other than of the queried one.

In some embodiments, objects determined or deemed to be subsequently required by the client computer are based on common and/or resembling properties of objects. For example, any one or more of keyword in an object, ownership of an object, access histories of an object, permissions of objects or classification of objects.

Accordingly, on demand or query by the client computer, the resources of the client computer are used to index and/or extend the index of the similar objects, thereby reducing the computational load of indexing the similar objects in and/or of the enterprise.

In some embodiments, the client computer extends the properties of similar object based on the properties of the requested properties and/or based on elements of the properties that are determined to be common among the properties.

In some embodiments, in case the client computer is on-line with the enterprise or part thereof, the client computer accesses at least some of the similar objects in the enterprise and operates to extend and/or complete the index of the objects in the enterprise.

Optionally or additionally, in some embodiments, the client computer requests at least some of the similar objects along with the properties thereof, and extends and/or completes the index of the objects locally on the client computer.

Yet optionally or additionally, in some embodiments, the client computer has and/or receives some of the similar objects, and extends and/or completes the index of the objects locally on the client computer.

In some embodiments, when the client computer indexes the objects locally, the client computer sends the properties to the enterprise, such as to the indexing server, for example, periodically and/or responsive to an event.

A potential technical effect of the disclosed subject matter is reducing computational load in the enterprise and/or reduced communication bandwidth consumption between the client computer and the enterprise.

A general non-limiting presentation of practicing the present disclosure is given below, outlining exemplary practice of embodiments of the present disclosure and providing a constructive basis for variant and/or alternative and/or divergent embodiments, some of which are subsequently described.

Figure 1A:
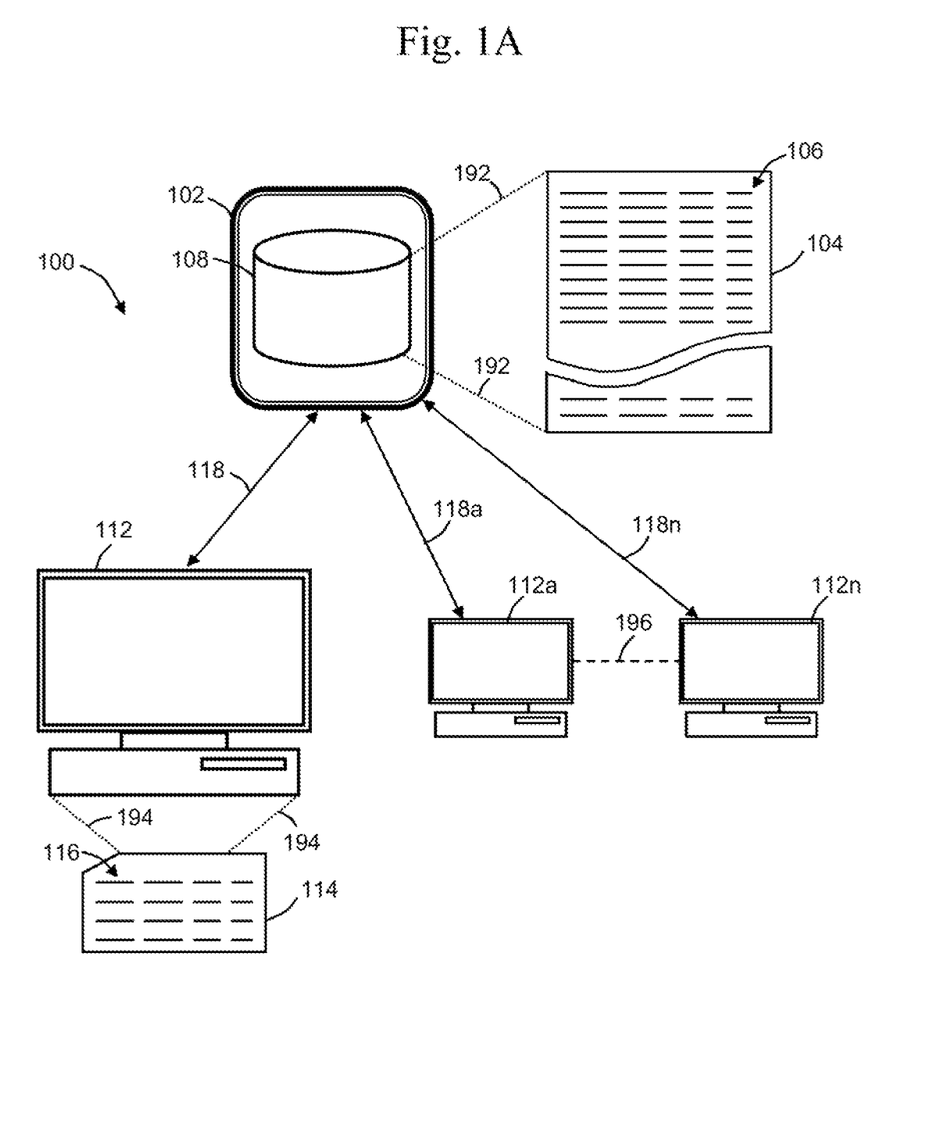
FIG. 1A schematically illustrates an arrangement of an indexing server having a storage and an at least one client computer connectable to the indexing server via a communication link, according to exemplary embodiments of the disclosed subject matter.

FIG. 1A schematically illustrates an arrangement 100 of an indexing server 102 of a computerized system in a role of an enterprise, and a client computer 112 connectable and/or connected to indexing server 102 via a communication link 118. The connection or link of client computer 112 to indexing server 102 may be direct and/or indirect via the interconnections of components and/or computes of the enterprise.

In some embodiments, client computer 112 represents any number of client computers, denoted as a client computer 112*a* to a client computer 112*n*, as illustrated also by a dashed line 196, and connectable and/or connected to indexing server 102, directly and/or indirectly, via a communication link 118a to a communication link 118n, respectively.

As illustrated by dotted lines 192, indexing server 102 comprises storage 108 and maintains an index 104 of objects of the enterprise with entries of index 104 illustrated as entries 106.

As illustrated by dotted lines 194, client computer 112 also maintains an index 114 of objects thereof, with entries of index 114 illustrated as entries 116.

Generally, without limiting, an enterprise includes and/or linked to a sizeable number objects, ranging, for example, from several thousands to hundreds of thousands. Generally, the objects are continuously subject to accesses, modifications, creations and deletions, so that the properties thereof are correspondingly subject to changes. Thus, indexing server 102 may not be able to index all the objects completely and to maintain an up-to-date index, particularly for properties regarding contents of the objects.

In some embodiments, client computer 112 requests from the computerized system properties of a particular object of the computerized system such as maintained in index 104 of the computerized system.

Having acquired the properties of the particular object, there is a likelihood or expectation that client computer 112 would require, possibly at a later time, to relate to similar objects and/or properties of similar objects having similarity and/or other relationships to the acquired objects as depicted or represented in the properties of the objects.

Thus, when client computer 112 requests the properties of the particular object, the computerized system responds by sending also the properties of similar objects.

Properties are determined as similar properties such as by having one or more elements that are shared and/or common in the properties or in parts thereof. For example, keywords of the contents of objects, title of objects, descriptions of objects, ownerships of objects, access histories of objects, access permissions of objects or classification of objects. Likewise, objects are determined to be similar when having corresponding similar properties.

In some embodiments, such as to reduce communication overhead and/or bandwidth, the computerized system sends the similar properties in one transmission or message, optionally after packing and/or compression.

In some embodiments, having acquired the properties of similar objects, client computer 112 accesses the corresponding objects in the computerized system and uses the resources, such as computational resources thereof, to extend and/or complete the properties of the similar objects locally on client computer 112, thereby off-loading the computerized system in indexing the similar objects.

In some embodiments, client computer 112 requests the properties of an object without requesting the object. For example, in case the object is already stored in client computer 112, or in case client computer 112 is linked to the computerized system and can access the object, or in case some similar objects are expected to be received by client computer 112, or in case client computer 112 is expecting to consult about the similar objects as depicted in the properties thereof.

In some embodiments, client computer 112 requests from the computerized system properties of a particular object of the computerized system and the computerized system provides client computer 112 with the particular object along with the properties thereof. In some embodiments, the computerized system provides to client computer 112 properties of the similar objects along with at least some of the similar objects, optionally with all of the similar objects. Thus, client computer 112 extends and/or completes the properties of the similar objects received in client computer 112 locally on client computer 112 even when client computer 112 is off-line with the computerized system.

In some embodiments, client computer 112 may receive some of the similar objects from other sources, such as from another client computer.

It is noted that, in some embodiments, client computer 112 receives incomplete properties of objects, wherein the properties are optionally incomplete with respect the contents of the objects. Thus, extending and/or completing the properties imply also extending and/or completing the properties with respect to contents of the objects.

Having extended and/or completed indexing of the similar objects, client computer 112 updates the enterprise, such as indexing server 102, such as responsive to an expired period and/or responsive to an event. For example, an event generated by the computerized system for updating of indexing server 102.

In some embodiments, the computerized system determines whether to provide client computer 112 with properties of similar objects, and, optionally, at least some of the similar objects. Optionally or alternatively, in some embodiments, the request by client computer 112 includes an indication, such as by a code, as for what data is requested from the computerized system. For example, the request may indicate that an object and properties thereof along with the properties of similar objects are to be provided by the computerized system, or the request may indicate that some or all of the similar objects are also to be provided.

A potential corollary of acquiring properties of similar objects by the client computer is that when, as indeed rather likely, one or more of the similar objects are received at the client computer then the properties thereof is already present locally in the client computer. Thus, the client computer may inquire on properties of the object and/or operate on the objects and correspondingly revise the properties thereof.

Figure 2A:
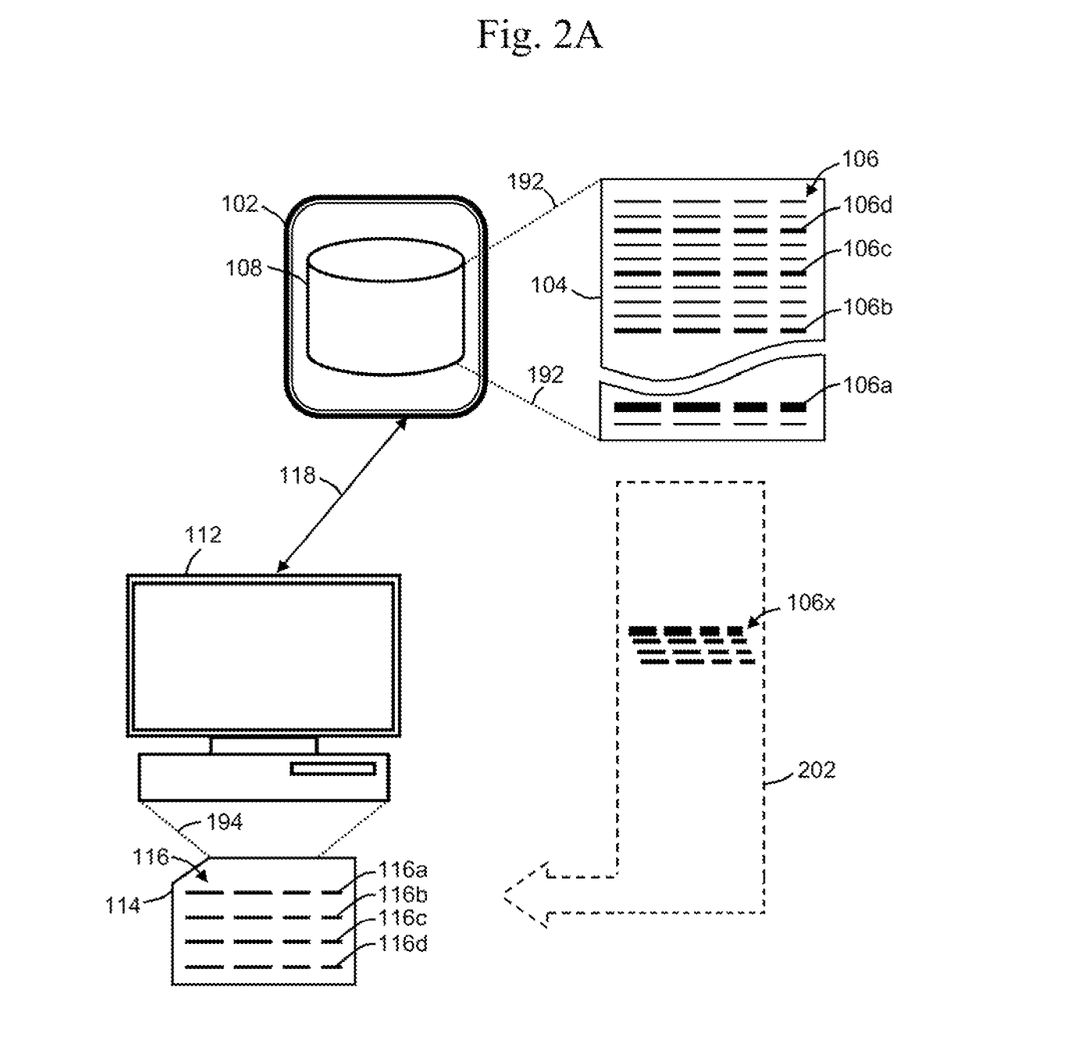
FIG. 2A schematically illustrates retrieving by a client computer index entries of similar objects of a computerized system, according to exemplary embodiments of the disclosed subject matter.

FIG. 2A schematically illustrates retrieving by a client computer 112 index entries of similar objects of computerized system, according to exemplary embodiments of the disclosed subject matter.

The index entries of similar objects in index 104 are schematically illustrated as entry 106a up to entry 106d respective to similar objects of the computerized system Assuming, by way of example, that properties as in entry 106a are requested from the computerized system by client computer 112, optionally with an indication that properties of similar objects are to be provided. Consequently, the computerized system checks or determines by or in index 104 what entries thereof include similar properties. For example, entry 106b, entry 106c and entry 106d are determined to have similar properties to the properties of entry 106a.

Subsequently, the computerized system collects and/or packs and/or groups together entry 106a up to entry 106d, and sends the cited entries to client computer 112, as illustrated schematically by an arrow 202 and a group 106x where the latter represents the sent entries.

In some embodiments, upon receiving of group 106x, client computer 112 stores the content of entry 106a up to entry 106d in index 114 of client computer 112 in entry 116a up to entry 116d, respectively. In case entry 106a up to entry 106d were packed or grouped or compressed, client computer 112 un-packs or un-groups or decompresses, respectively, group 106x before storing in index 114.

In some embodiments, in case client computer 112 carried out operations that require revising the acquired properties, client computer 112 updates the properties locally on the client computer. Subsequently, such as responsive to the revision and/or later on, such as periodically, client computer 112 updates index 104 of the computerized system with the locally updated properties.

Figure 2B:
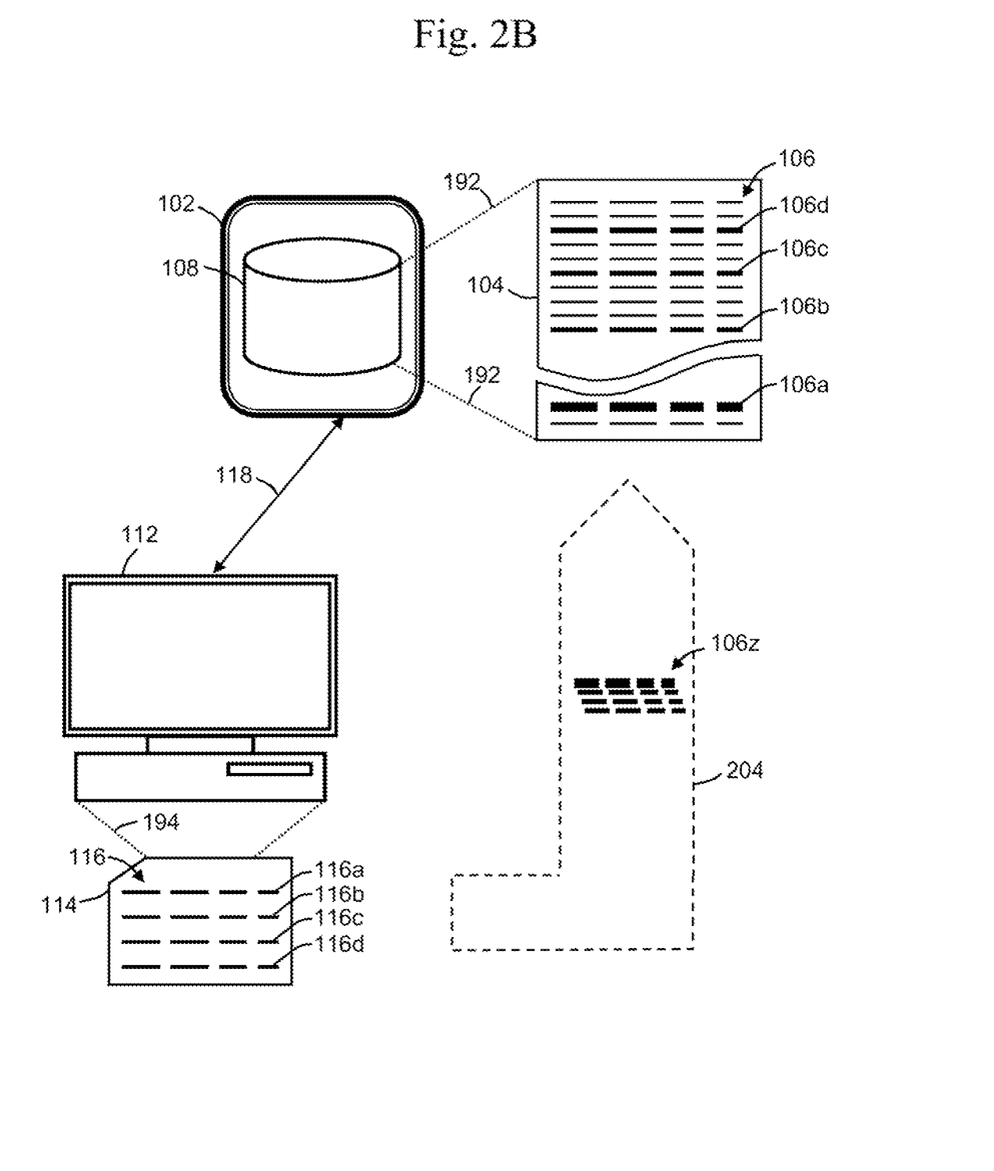
FIG. 2B schematically illustrates updating a computerized system by a client computer with updated properties of similar objects, according to exemplary embodiments of the disclosed subject matter.

FIG. 2B schematically illustrates updating by client computer 112 the computerized system with updated properties of similar objects that were updated in entry 116a up to entry 116d, according to exemplary embodiments of the disclosed subject matter.

In some embodiments, the properties in entry 116a up to entry 116d are sent to the computerized system, thereby entry 106a up to entry 106d, respectively, are updated in index 104 of the computerized system.

In some embodiments, client computer 112 collects and/or packs and/or groups together entry 116a up to entry 116d, and sends the cited entries to the computerized system as illustrated schematically by an arrow 204 and a group 106z where the latter represents the sent entries.

It is noted that indexing and/or extending the properties of an object requires computational load of exploring and/or searching inside the object in order to locate phrases and/or other data of within the object, and investigating properties of the objects such as permissions or classification.

In some embodiments, responsive to requesting properties of an object, the computerized system sends to client computer 112 similar properties of objects according to a priority or precedence.

In some embodiments, the priority or precedence is based on properties that are determined as most similar to the requested properties and/or the priority is based on a significance of an element or elements of the properties.

In some embodiments, the most similar properties are determined according to at least some number of elements of the properties that are shared with and/or common in the similar properties. In some embodiments, the significance of elements of the properties is according to at least one element determined as significant or prominent that is common to and/or shared with element of the properties. For example, a significant element is an owner of the objects corresponding to the similar properties, or permissions of the objects corresponding to the similar properties.

Thus, responsive to the query by client computer 112, the computerized system firstly sends the similar properties by the determined priority or precedence. Optionally, subsequently, such as responsive to a further query or queries, the computerized system further sends the similar properties by diminishing priorities or precedence.

Accordingly, in some embodiments, client computer 112 extends and/or completes the properties of objects with corresponding properties having high priority or priorities and ignores or disregards objects having or corresponding to properties of lower priority of priorities. Optionally or alternatively, in case after properties having lower priority or priorities are subsequently obtained from the computerized system, client computer 112 extends and/or completes the properties of objects with corresponding properties having lower priority or priorities.

It is noted that by using priorities the properties are not sent, or may not be sent, to client computer 112 in one 'chunk', but, rather, the properties are sent, or may be sent, in two or more 'chunks' according to the diminishing priorities.

It is noted that according to the architecture and/or configuration of the computerized system, the interaction with the computerized system, such as receiving properties from and/or updating of index 104, may be performed directly or indirectly with indexing server 102. For example, communication with indexing server 102 may be carried out via one or more other components of the computerized system. Likewise the operation of receiving queries and sending data may be carried out by indexing server 102 and/or with the participation of one or more components. The components are apparatus components, such as electronic and/or computerized components.

In some embodiments, indexing server 102 comprises and/or represents a plurality of indexing servers.

It is noted that the description regarding client computer 112 applies and/or may apply to any of client computer 112a to client computer 112n.

In some embodiments, client computer 112 and any or part of client computer 112a to client computer 112n are comprised and/or included in the enterprise, at least partly and/or at least for some time.

In some embodiments, storage 108 is a part of storage and/or storages of the computerized system or enterprise.

It is noted that transfers of properties and/or objects may be carried out in a push and/or pull manner according to circumstances such as configuration of a client computer and/or the indexing server. For example, after the client computer request properties of an object, the computerized system determines the similar properties, optionally by priority, and lists the corresponding entries of the index in a known structure. Subsequently, the client computer accesses the known structure and 'pulls' the properties from the entries of the index, optionally according to priority.

Figure 3A:
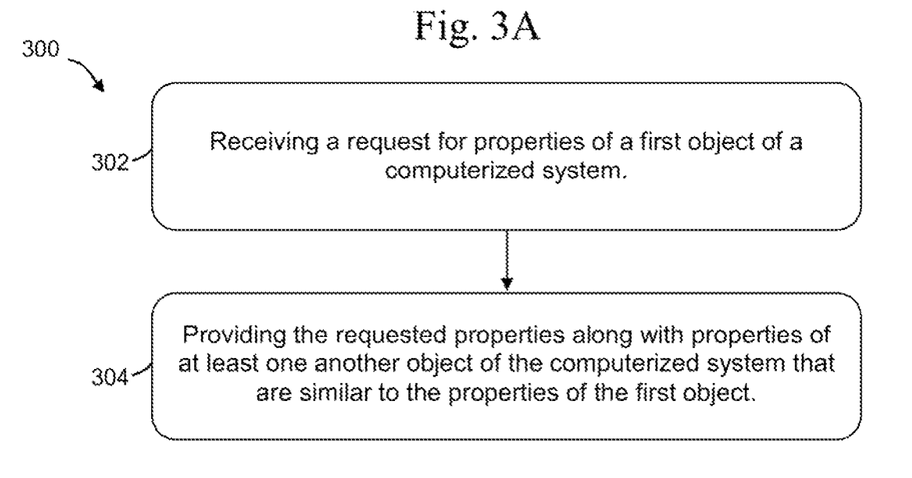
FIG. 3A outlines operations in providing on-demand properties of objects of a computerized system, according to exemplary embodiments of the disclosed subject matter.

FIG. 3A outlines operations, as operations 300, in providing on-demand properties of objects of a computerized system, according to exemplary embodiments of the disclosed subject matter.

In operation 302 a request for properties of a first object of a computerized system is received.

In some embodiments, the request is received at and/or by an indexing server of the computerized system and/or via another component of the computerized system having access to an index of the computerized system.

In some embodiments, the request is received from a computer that is linked, at least temporarily, to the computerized system.

In operation 304 and responsive to the received request, the requested properties along with properties of at least one another object of the computerized system that are similar to the properties of the first object of the computerized system is provided.

In some embodiments, the requested properties along with properties of at least one another object of the computerized system are provided to the by computer that has requested properties of the first object of the computerized system. The properties are provided by the indexing server of the computerized system and/or by another component of the computerized system having access to the index of the computerized system.

Properties are determined as similar such as by having one or more elements that are shared and/or common to the properties or parts thereof.

In some embodiments, having obtained the similar properties, the computer extends and/or completes the properties of objects with corresponding similar properties, and later on updates the computerized system with the properties of the objects.

Generally, without limiting, the properties are provided to the computer in one transmission and/or in smaller number of transmission relative to the number of transmission of properties of individual objects.

A potential rationale for providing properties further to the requested properties is that having asked for properties of an object, it is expected that properties of similar objects would be requested by the computer, and thus communication overhead is reduced relative to individually requesting properties of objects.

It is noted that the at least one another object of the computerized system stands for and/or represents a plurality of objects of the computerized system that are similar to the first object of the computerized system. It is also noted that referring to similar properties does not include one similar property.

Figure 3B:
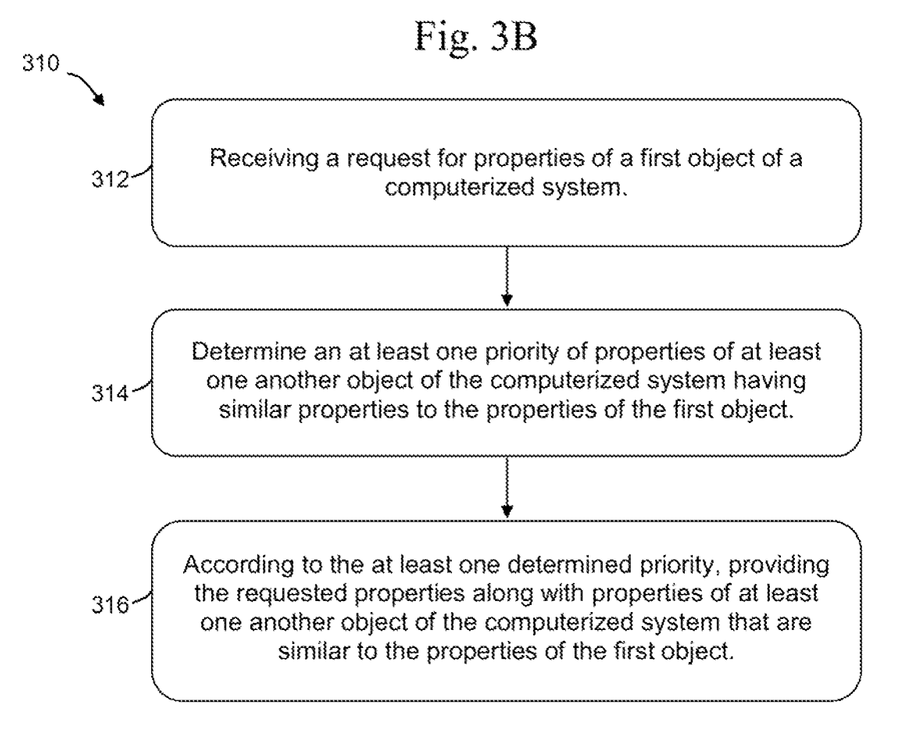
FIG. 3B outlines operations in providing on-demand properties of objects of a computerized system based on priority, according to exemplary embodiments of the disclosed subject matter.

FIG. 3B outlines operations, as operations 310, in providing on-demand properties of objects of a computerized system based on priority, according to exemplary embodiments of the disclosed subject matter, where operations 310 are a variation of operations 300.

Similarly and/or equivalently to operation 302, in operation 312 a request for properties of a first object of a computerized system is received.

In operation 314 an at least one priority or precedence of properties of at least one another object of the computerized system having similar properties to the properties of the first object is determined.

In some embodiments, the priority or precedence is based on properties that are determined as most similar to the requested properties, such as by the number of common elements, and/or on a significance of an element or elements of the properties respective to the queried properties, such as a common ownership of objects that correspond to the similar properties.

In operation 316, as a variation of operation 304, the requested properties along with properties of at least one another object of the computerized system that are similar to the properties of the first object is provided according to the at least one determined priority.

Thus, in some embodiments, the computer extends and/or completes the properties of objects with corresponding properties having high priority or priorities in precedence of properties having lower priority or priorities. Optionally or alternatively, the co ter ignores or disregards objects having corresponding properties of lower priority or priorities.

In some embodiments, having obtained similar properties, the computer extends and/or completes the properties of objects with corresponding similar properties, optionally according to the priority or precedence, and later on updates the computerized system with the properties of the objects.

It is emphasized that properties of object refer to external information, or metadata, of objects as well as to internal information of objects such as contents thereof, at least when extended and/or completed. It is further emphasized that the computer receives, in some embodiments, incomplete properties, optionally incomplete with respect to contents of the objects.

There is thus provided according to the present disclosure a method for in-advance obtaining properties of objects of a computerized system, the method comprising receiving a request for properties of a first object, and responsively providing the requested properties along with properties of an at least one another object that are similar to the properties of the first object, wherein the properties of the at least one another object are similar to the properties of the first object by having at least one element that is common therebetween, and wherein the method is carried out by an at least one apparatus component of the computerized system.

In some embodiments, the requested properties and the properties of the at least one another object that are similar to the properties of the first object are provided in one transmission.

In some embodiments, the at least one another object comprises a plurality of other objects.

In some embodiments, the request is received from a computer that is at least temporarily linked to the computerized system.

In some embodiments, the requested properties and the properties of the at least one another object that are similar to the properties of the first object are provided to the computer.

In some embodiments, the properties of an object comprise contents of an entry of an index of the computerized system.

In some embodiments, the index is maintained by an indexing server of the computerized system.

In some embodiments, providing the requested properties is according to a determined priority.

In some embodiments, the determined priority is based on a number of common elements of the properties.

In some embodiments, the determined priority is based on a significance of an element of the properties.

In some embodiments, the properties imply at least one property.

There is thus further provided according to the present disclosure an apparatus for in-advance obtaining properties of objects of a computerized system, the apparatus comprising an at least one storage device and an indexing server configured to index and maintain properties of objects in the at least one storage device, wherein the indexing server is configured to receive a request for properties of a first object and to respond with the requested properties along with properties of an at least one another object that are similar to the properties of the first object, and wherein the properties of the at least one another object are similar to the properties of the first object by having at least one element of properties that is common therebetween.

In some embodiments, the apparatus further configured to respond with properties of a plurality of other objects that are similar to the properties of the first object.

In some embodiments, the apparatus further configured to respond with properties of a plurality of other objects that are similar to the properties of the first object according to a determined priority.

In some embodiments, the properties imply at least one property.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function (s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A computerized method for reducing communication overhead between a client computer and an indexing server in a computerized system and the computerized method comprising:

in a computerized system comprising an indexing server, a storage device for storing properties of a plurality of objects, and at least one client computer, receiving by a processor of the indexing server, a request from a first client computer over a communication network for properties in an entry of a first object in the plurality of objects;

responsive to receiving the request, determining by the processor:

(i) other objects deemed to be subsequently required by the first client computer based on properties in entries of the other objects in the plurality of objects that are similar to the properties in the entry of the first object by at least two common elements therebetween; and (ii) a priority based on a number of the at least two common elements in the properties of the other objects in the plurality of objects, packing by the processor the entries corresponding to the requested properties along with entries corresponding to said properties of the other objects deemed to be subsequently required by the first client computer, in accordance with the determined priority; and sending by the processor the packed entries in one transmission over the communication network to the first client computer to avoid superfluous queries about the determined other objects, thus reducing communication overhead or bandwidth in the communication network, wherein the properties of the other objects comprise properties of all other objects determined as similar to the properties of the first object, wherein properties of an object in said plurality of objects are selected from: names of the object, addresses of the object in a storage device or links to a network storage device, access histories of the object, access permissions to the object, classification of an object, attributes of the object set by an operating system, and keywords or phrases or extracts or citations or excerpts from the object.

2. The computerized method according to claim 1, wherein an object in said plurality of objects comprise a document, a file, or a database having properties of an object.

3. The computerized method according to claim 1, further comprising compressing the packed entries for the one transmission over the communication network.

4. The computerized method according to claim 1, wherein the first client computer is at least temporarily linked to the indexing server over the communication network when sending the request.

5. A computerized system for managing properties of objects with reduced communication overhead between a client computer and an indexing server in a computerized system, the computerized system comprising:
- a storage device for storing properties of a plurality of objects;
- at least one client computer; and
- an indexing server comprising a processor configured to:
  - receive a request from a first client computer over a communication network for properties in an entry of a first object in the plurality of objects,
  - responsive to receiving the request, determine:
    - (i) other objects deemed to be subsequently required by the first client computer based on properties in entries of other objects in the plurality of objects that are similar to the properties in the entry of the first object by at least two common elements therebetween; and
    - (ii) a priority based on a number of the at least two common elements in the properties of the other objects in the plurality of objects,
  - pack the entries corresponding to the requested properties along with entries corresponding to said properties of the other objects deemed to be subsequently required by the first client computer in accordance with the determined priority, and
  - send the packed entries in one transmission over the communication network to the first client computer to avoid superfluous queries about the determined other objects, thus reducing communication overhead or bandwidth in the communication network,
  - wherein the properties of the other objects comprise properties of all other objects determined as similar to the properties of the first object,
- wherein properties of an object in said plurality of objects are selected from: names of the object, addresses of the object in a storage device or links to a network storage device, access histories of the object, access permissions to the object, classification of an object, attributes of the object set by an operating system, and keywords or phrases or extracts or citations or excerpts from the object.

6. The computerized system according to claim 5, wherein properties of an object in said plurality of objects are selected from: names of the object, addresses of the object in a storage device or links to a network storage device, access histories of the object, access permissions to the object, classification of an object, attributes of the object set by an operating system, and keywords or phrases or extracts or citations or excerpts from the object.

7. The computerized system according to claim 5, wherein an object in said plurality of objects comprise a document, a file, or a database having properties of an object.

8. The computerized system according to claim 5, wherein the processor is configured to compress the packed entries for the one transmission over the communication network.

9. The computerized system according to claim 5, wherein the first client computer is at least temporarily linked to the indexing server over the communication network when sending the request.

10. The computerized method according to claim 1, wherein, resources of the first client computer are used for indexing or to complete indexing of the other objects, thereby reducing computational load of indexing of the other objects in the indexing server.

11. The computerized method according to claim 10, the first client computer further sends to the indexing server the indexing of the other objects.

12. The computerized system of claim 5, wherein, resources of the first client computer are used for indexing or to complete indexing of the other objects, thereby reducing computational load of indexing of the other objects in the indexing server.

13. The computerized system of claim 5, the first client computer further sends to the indexing server the indexing of the other objects.

* * * * *